United States Patent [19]

Korman et al.

[11] Patent Number: 5,609,946

[45] Date of Patent: Mar. 11, 1997

[54] HIGH FREQUENCY, HIGH DENSITY, LOW PROFILE, MAGNETIC CIRCUIT COMPONENTS

[75] Inventors: Charles S. Korman, Schenectady; Israel S. Jacobs, Niskayuna; John A. Mallick, Scotia; Waseem A. Roshen, Clifton Park, all of N.Y.

[73] Assignee: General Electric Company, Schenectady, N.Y.

[21] Appl. No.: 538,488

[22] Filed: Oct. 3, 1995

[51] Int. Cl.$^6$ ........................................ B32B 9/00
[52] U.S. Cl. ........................ 428/209; 501/17; 501/32; 428/210; 333/246
[58] Field of Search .................... 428/209, 210; 501/17, 32; 333/1.1

[56] References Cited

U.S. PATENT DOCUMENTS

| | | | |
|---|---|---|---|
| 3,520,664 | 7/1970 | York | 428/209 |
| 5,079,222 | 1/1992 | Yamazaki | 428/209 |
| 5,312,674 | 5/1994 | Haertling et al. | 428/209 |

OTHER PUBLICATIONS

"Planar Inductor", K. Kawabe H. Koyama, K. Shirae, IEEE Transactions on Magnetics, vol. 3 Mag–20, No. 5, Sep. 1984, pp.1804–1806.

"High Frequency Magnetic Properties of CoFe/SiO2 Multilayer Film with the Inverse Magnetostrictive", Masakatsu Senda, Osamu Ishii, IEEE Transactions on Magnetics, vol. 30, No. 1, Jan. 1994, pp. 155–158.

"A New Toroidal–Meander Type Integrated Inductor with a Multilevel Meander Magnetic Core", Chong H. Ahn, Mark G. Allen, IEEE Transactions on Magnetics, vol. 30, No. 1, Jan. 1994, pp. 73–79.

"A Magnetic Thin Film Inductor and it Application to a MHz Switching dc–dc Converter", Toshior Sato, Hiroshi Tomita, Atsuhito Swabe, Tetsuo Inoue, Tetsuhiko Mizogochi, Masashi Sahashi, IEEE Transactions on Magnetics, vol. 30, No. 2, Mar. 1994, pp. 217–223.

"Magnetic Thin Film Inductors for Integrated Circuit Applications", RF Soohoo, IEEE Transactions on Magnetics, vol. Mag. 15, No. 6, Nov. 1979, pp. 1803–1805.

*Primary Examiner*—Patrick Ryan
*Assistant Examiner*—Cathy F. Lam
*Attorney, Agent, or Firm*—Jill M. Breedlove; Marvin Snyder

[57] ABSTRACT

A high frequency, high density, low profile magnetic circuit component includes a magnetic core having a first magnetic layer and a second magnetic layer with a conductive layer deposited therebetween, each magnetic layer being a multilayer structure comprised of alternating magnetic and insulating films. The magnetic films are anisotropic and are driven along their magnetic hard axis in order to reduce excess eddy current losses. To reduce fringing field eddy current losses, a distributed air gap is structured in the magnetic layers. The magnetic core has a distributed air gap formed therein in order to minimize eddy current losses in the conductive layer. The conductive layer has a conductive material patterned on a insulating substrate and is situated between the first and second magnetic layers such that the conductive material extends beyond the peripheries of the first and second magnetic layers, thereby maximizing the amount of magnetic material that is driven in the hard axis.

10 Claims, 6 Drawing Sheets

HIGH FREQUENCY, HIGH DENSITY, LOW PROFILE, MAGNETIC CIRCUIT COMPONENTS

FIELD OF THE INVENTION

The present invention relates generally to magnetic circuit components and, more particularly, to high frequency magnetic components using anisotropic multilayer magnetic films.

BACKGROUND OF THE INVENTION

High operating frequencies are desirable for power conditioning equipment (such as power supplies, power amplifiers, and lamp ballasts) in order to reduce the size of the magnetic components used therein. Unfortunately, however, it has been heretofore impossible to substantially reduce the size of magnetic components because the operating flux density would have to be reduced too much for proper operation and still have acceptable losses at high frequencies. In particular, while at low frequencies the operating flux density can exceed 10,000 Gauss using bulk ferromagnetic material, the operating flux density to achieve acceptable losses in the megahertz range is from about 20 to 400 Gauss, which is too low for proper operation.

Another problem with magnetic components is high profile. In the present state of the art, devices having a height on the order of 0.1 inch can be constructed with machined ferrites and high density interconnect (HDI) windings using multipole designs, such as described in U.S. patent application No. 08/043,166 of W. A. Roshen, C. S. Korman and W. Daum, filed Apr. 1, 1993, assigned to the instant assignee and incorporated by reference herein. A further reduction in the height of power magnetic devices is difficult because machined ferrites are fragile.

Yet another problem with the use of ferrites is their relatively low Curie temperature which makes them unsuitable for high temperature applications. Powdered iron is also unsuitable for high temperature use due to the properties of available binders.

Accordingly, it is desirable to provide high power magnetic circuit components having a reduced height and weight which are capable of operating at high flux density levels at high frequencies (e.g., 1–10 MHz) and at high temperatures. Furthermore, such magnetic circuit components should be compatible with high density packaging techniques, such as HDI techniques.

SUMMARY OF THE INVENTION

A high frequency, high density, low profile magnetic circuit component comprises a magnetic core having a first magnetic layer and a second magnetic layer with a conductive layer deposited therebetween, each magnetic layer comprising a multilayer structure comprised of alternating magnetic and insulating films. The magnetic films comprise a magnetic material having anisotropic magnetic properties such that, in operation, the magnetic material is driven along its hard axis. Driving the magnetic material along the hard axis results in a substantial reduction of excess eddy current losses, which would otherwise dominate the high frequency losses in the magnetic material. In one embodiment, the magnetic layers comprise alternating films of a ferromagnetic material, such as nickel-iron alloys (NiFe), and silicon dioxide ($SiO_2$). The magnetic core has a distributed air gap formed therein in order to minimize eddy current losses in the conductive layer. The conductive layer comprises a conductive material patterned on an insulating substrate and is situated between the first and second magnetic layers such that the conductive material extends beyond the peripheries of the first and second magnetic layers, thereby maximizing the amount of magnetic material that is driven in the hard axis.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
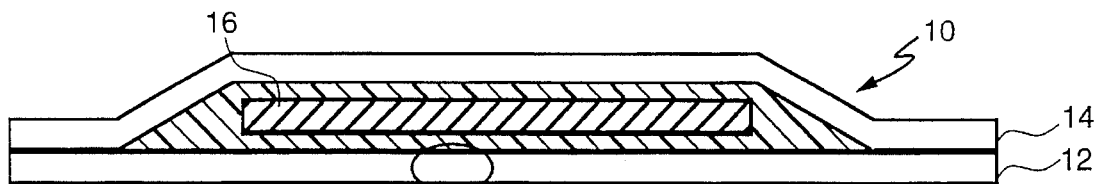
FIG. 1A is a cross sectional view illustrating the basic structure of a magnetic component comprising a shielded microstrip and FIG. 1B is an exploded view of a magnetic layer of FIG. 1A.
Figure 1B:
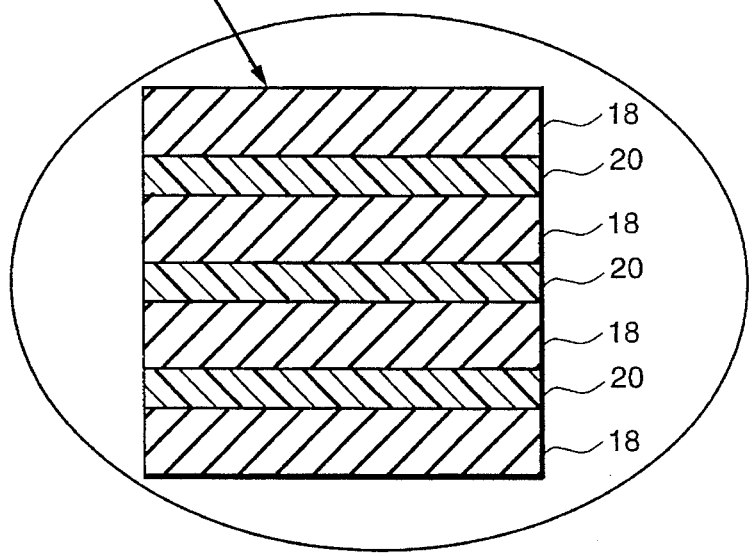

FIGS. 1A and 1B illustrates a simple inductor comprising a shielded microstrip structure having a core 10 comprising a first magnetic layer 12 and a second magnetic layer 14 with a conductive layer 16 disposed between the magnetic layers 12 and 14. The magnetic layers 12 and 14 each comprise a multilayer structure comprised of alternating magnetic and insulating films 18 and 20, respectively in order to minimize eddy current losses. The magnetic films 18 comprise a magnetic material having anisotropic magnetic properties, e.g., a ferromagnetic material, such as nickel-iron alloys (conducting) (NiFe), or a ferrimagnetic oxide (semiconducting ferrite). The insulating films 20 comprise a suitable insulating material, such as silicon dioxide ($SiO_2$), magnesium oxide, aluminum oxide, or Kapton polyimide film manufactured by E. I. duPont de Nemours and Company. The magnetic films comprise a magnetic material having anisotropic magnetic properties such that, in operation, the magnetic material is driven in a direction parallel to its hard axis. In order to ensure that the magnetic material will be driven in the direction of the hard axis, an external magnetic field is applied during deposition of the magnetic material in the direction of the easy axis. A typical thickness for magnetic films 18 is on the order of 1 to 5 microns; and a typical thickness for insulating films 20 is on the order of 10 to 100 nm. As shown in FIG. 1, the air gap between the magnetic layers 12 and 14 is minimized near the edges of the conductive layer 16 to facilitate magnetic circuit closure.

Figure 2A:
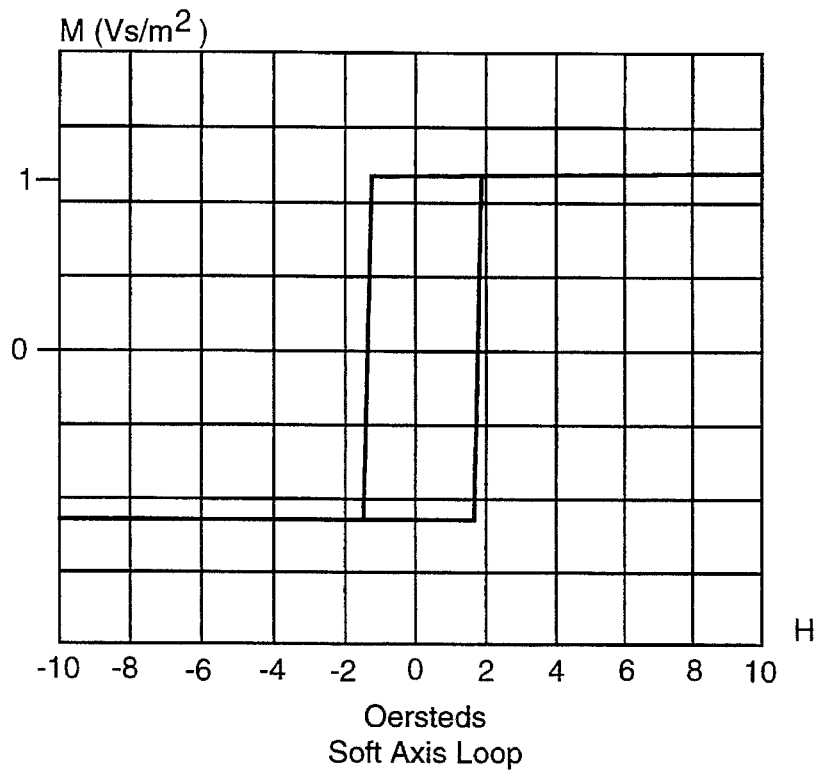
FIGS. 2A and 2B graphically illustrate measured hysteresis loops of multilayer magnetic rims comprising a nickel-iron alloy along the easy and hard axes, respectively.
Figure 2B:
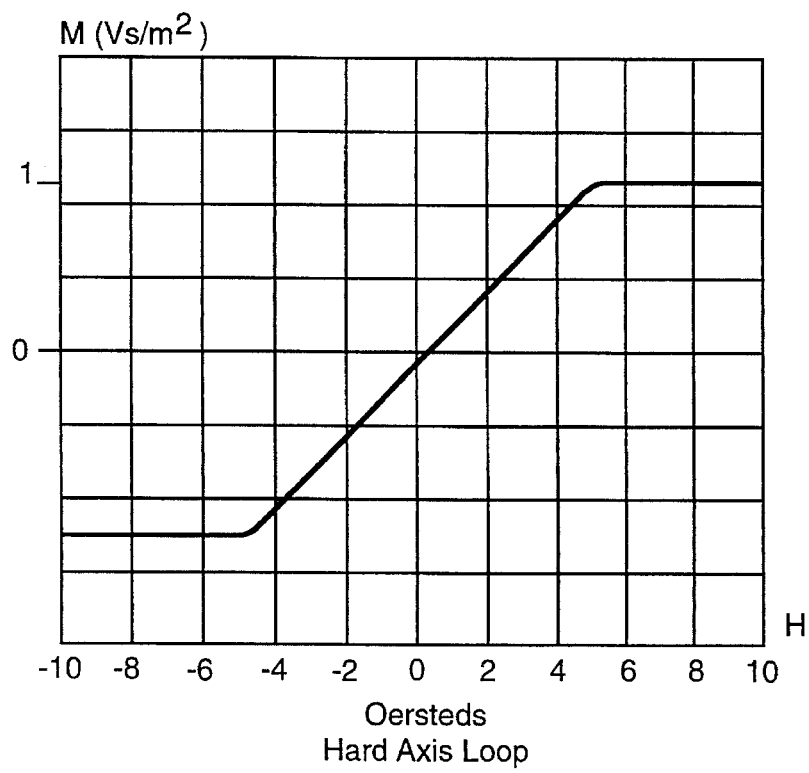

FIGS. 2A and 2B graphically illustrate measured hysteresis loops for a multilayer magnetic structure comprising a nickel-iron alloy along the soft and hard axes, respectively. The hysteresis loop along the hard axis is very narrow. Advantageously, therefore, hysteresis losses are minimized by driving the magnetic film along the hard axis.

Figure 3:
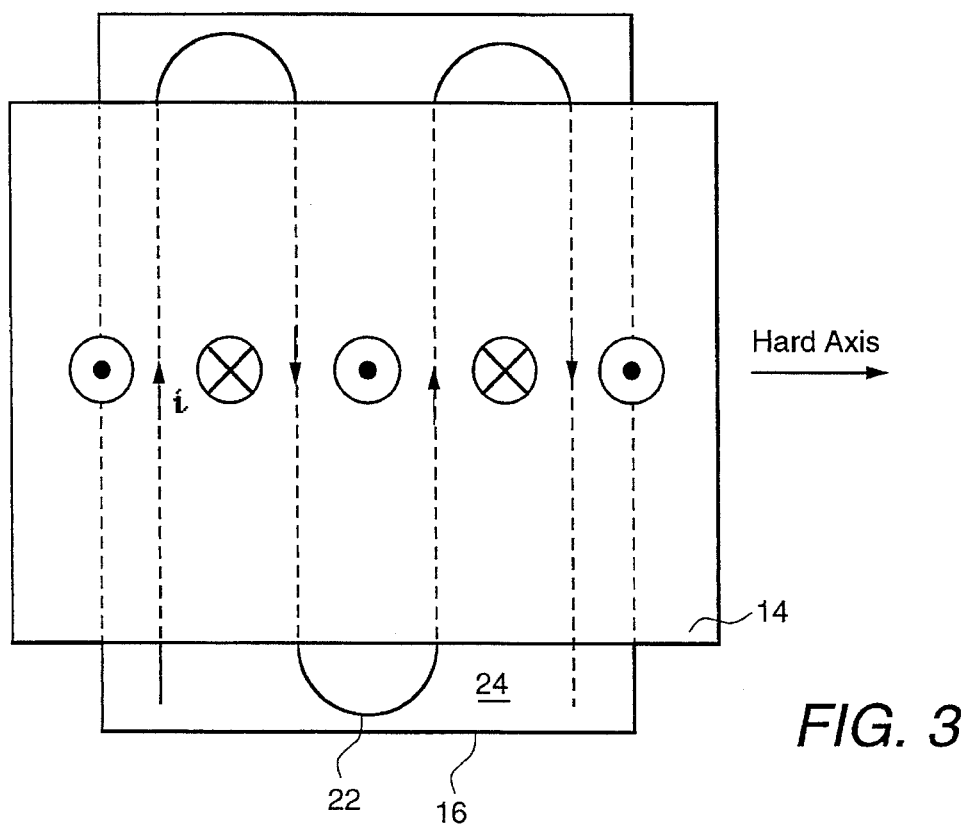
FIG. 3 is a top view, partially schematic, illustrating an exemplary conductor pattern for the conductive layer of the shielded microstrip of FIG. 1.

As illustrated schematically in FIG. 3, the conductive layer 16 comprises a conductive material 22, e.g., copper, patterned on a suitable insulating substrate 24, for example, Kapton polyimide film, which is flexible, or glass or alumina. The conductive layer may be a single layer or a multilayer structure. In FIG. 3, i represents the direction of current flow, and the dots and X's represent direction of magnetic flux out of and into the page, respectively. The conductive material 22 may be deposited on the insulating substrate 24 using any suitable thin film manufacturing process, such as vapor deposition, laser deposition, sputtering, or electroplating. As shown, the conductive material is situated between the first (14) and second magnetic layers such that the conductive material extends beyond the peripheries of the first and second magnetic layers. In this way, the amount of magnetic material that is driven in the hard axis is maximized, thereby minimizing hysteresis losses.

Figure 4:
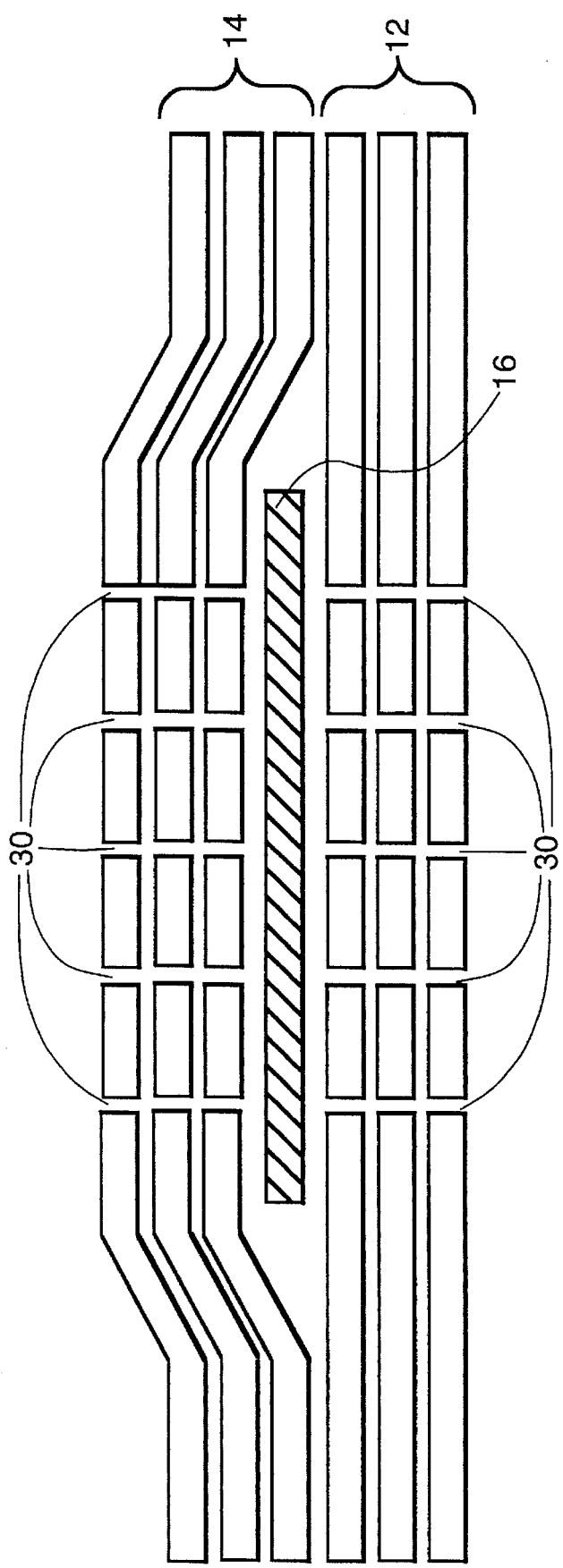
FIG. 4 is a cross sectional view illustrating magnetic component comprising a shielded microstrip with a distributed air gap in accordance with the present invention.

FIG. 4 illustrates a magnetic circuit component comprising a shielded microstrip with a distributed air gap comprising small air gaps 30 distributed in the first and second magnetic layers 12 and 14, except at the edges of the conductive layer 16. The length of each small air gap 30 is preferably on the order of a few microns. By distributing the air gap as shown, eddy current losses in the conductive layer 16 are minimized and the total air gap length can be fine tuned, which allows for more precise control of the inductance value of the component. The small air gaps 30 can be made by photolithographic or other suitable patterning/masking techniques, such as wet-etching or laser patterning.

Figure 5A:
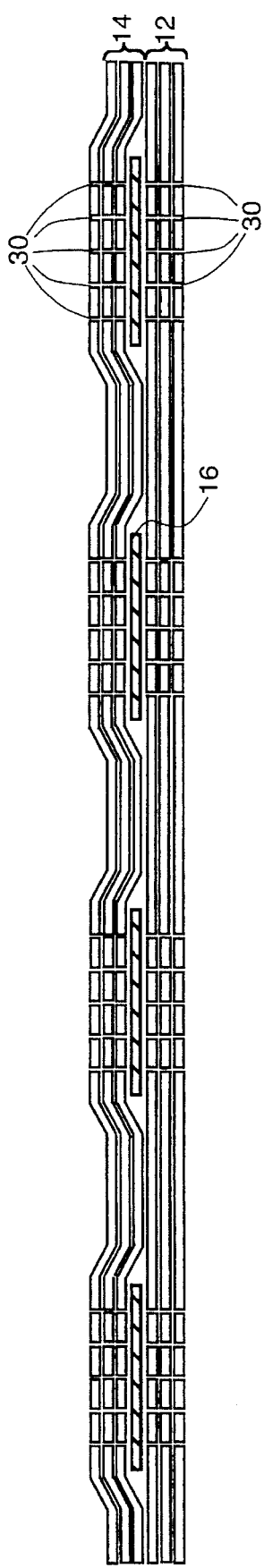
FIG. 5A is a cross sectional view of a multipole core structure with a distributed air gap in accordance with the present invention.
Figure 5B:
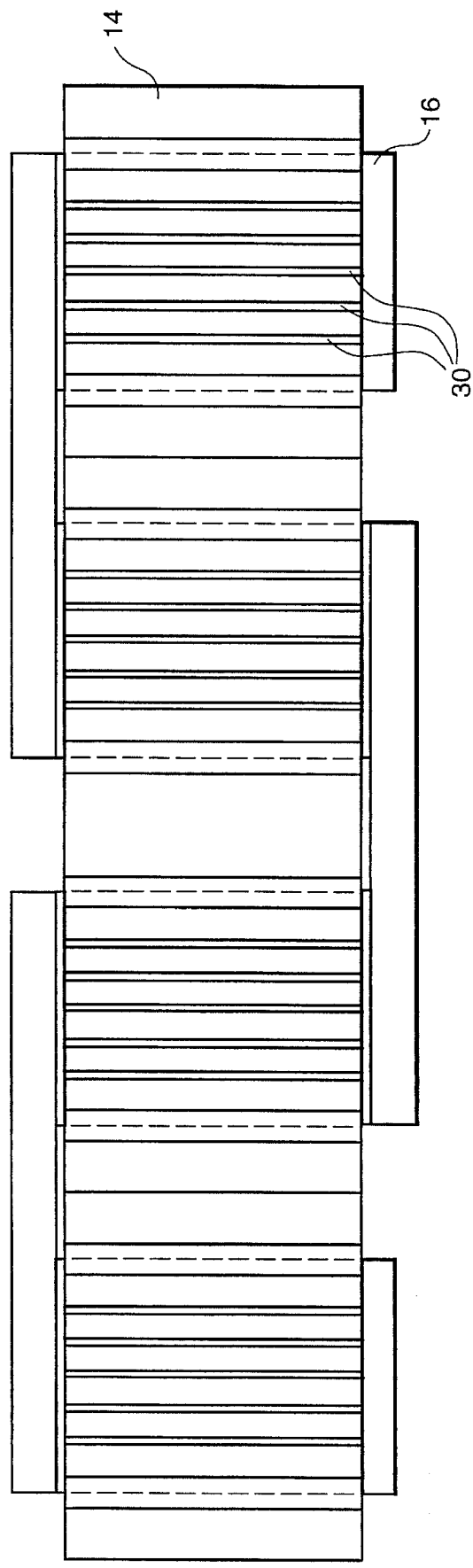
FIG. 5B is a top view of the multipole core structure of FIG. 4A.

FIGS. 5A and 5B illustrate a multipole core structure comprising a plurality of magnetic circuits, such as those of FIG. 4, with distributed air gaps.

Figure 6:
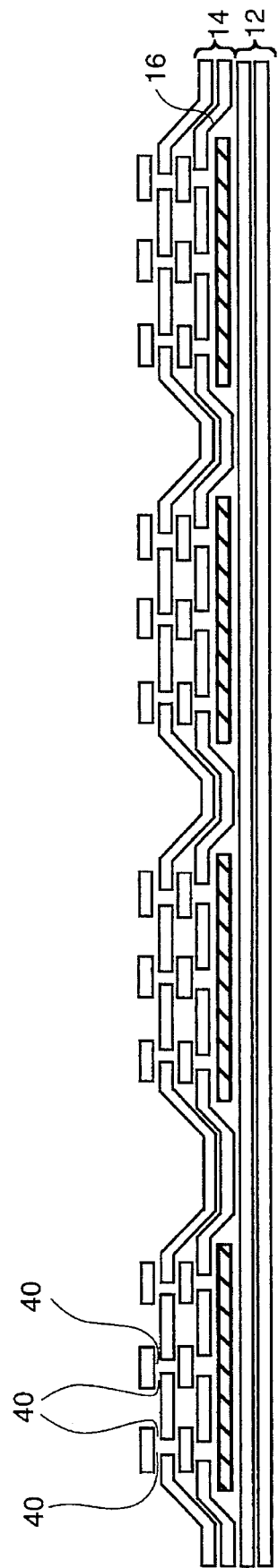
FIG. 6 is an alternative embodiment of a magnetic component comprising a shielded microstrip with a distributed air gap in accordance with the present invention.

FIG. 6 illustrates an alternative embodiment of a magnetic component with a distributed air gap in accordance with the present invention. By way of example, FIG. 6 illustrates another multipole structure. The air gap length for each single pole structure comprises the sum of the lengths of each of a plurality of small air gaps 40, the length of each small air gap 40 being the thickness of the insulating layer 20. Such a structure allows for even more fine tuning of the air gap length; that is, since the interleaving insulating layers 20 can be made very thin (e.g., 10–100 nm), then the distributed air gap can be fixed on a very small scale.

Figure 7:
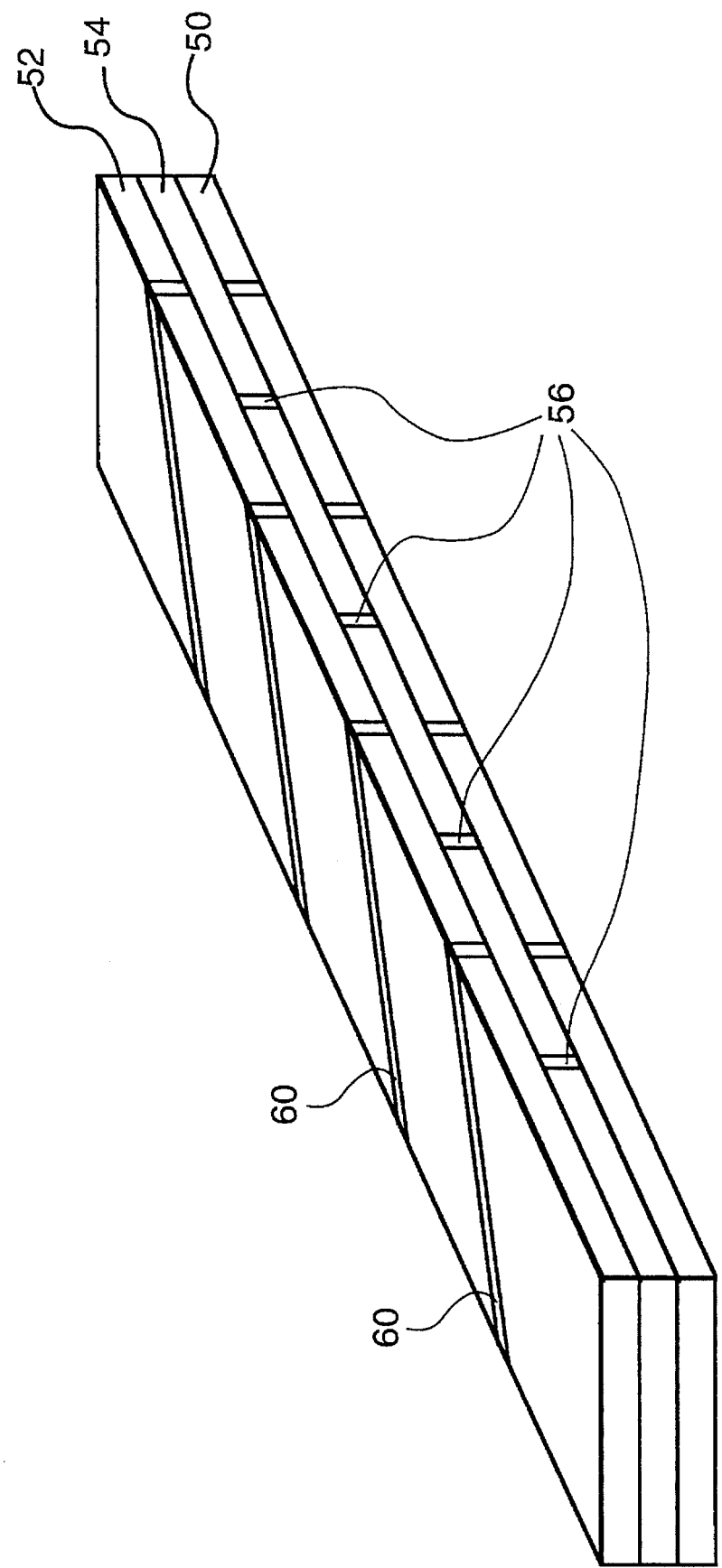
FIG. 7 is an alternative embodiment of a magnetic component comprising a shielded microstrip with a distributed air gap in accordance with the present invention.

FIG. 7 illustrates an alternative embodiment of a magnetic component with a distributed air gap in accordance with the present invention comprising first and second conductive layers 50 and 52, respectively, and a magnetic layer 54 situated therebetween. The distributed air gap comprises a plurality of small air gaps 56. The middle magnetic layer 54 comprises alternating magnetic and insulating layers as in the other embodiments described hereinabove. The first and second conductive layers are patterned such that they make at least one continuous loop 60 around the middle magnetic layer. To this end, interlayer connections between the first and second layers can be provided through, for example, metallized vias (not shown).

Efficiency of magnetic components manufactured in accordance with the present invention increases as the number of layers, or films, increases. Use of several layers can provide efficiencies in the high ninetieth percentile.

Advantageously, a magnetic circuit component constructed in accordance with the present invention has a very low profile, a high power density, is lightweight, and is capable of high temperature operation at high operating frequencies (e.g., on the order of 1–10 MHz).

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A magnetic circuit component, comprising:
   a magnetic core comprising a first magnetic layer and a second magnetic layer, each said magnetic layer comprising a multilayer structure comprising alternating magnetic and insulating films, said magnetic films each comprising a magnetic material having anisotropic magnetic properties such that, in operation, said magnetic material is driven in a direction parallel to its hard axis, said magnetic core having a distributed air gap formed therein; and
   a conductive layer deposited between said first and second magnetic layers, said conductive layer comprising a conductive material patterned on an insulating substrate.

2. The magnetic circuit component of claim 1 wherein said conductive material is situated between said first and second magnetic layers such that said conductive material extends beyond the peripheries of said first and second magnetic layers.

3. The magnetic circuit component of claim 1 wherein said distributed air gap comprises a plurality of small air gaps distributed in said first and second magnetic layers.

4. The magnetic circuit component of claim 1 wherein said distributed air gap comprises a plurality of small air gaps formed between magnetic films in said magnetic layers such that each of said small air gaps has a length equal to the length of the insulating film situated between adjacent magnetic films.

5. The magnetic circuit component of claim 1 comprising a multipole core structure.

6. The magnetic circuit component of claim 1 wherein said magnetic material is selected from a group consisting of ferromagnetic and ferrimagnetic materials.

7. The magnetic circuit component of claim 1 wherein said insulating films comprise a material selected from a group consisting of silicon dioxide, magnesium oxide, aluminum oxide, and polymeric insulating films.

8. A magnetic circuit component, comprising:
   first and second conductive layers, each comprising a conductive material patterned on a insulating substrate; and
   a magnetic core situated between said first and second conductive layers and comprising alternating magnetic and insulating films, said magnetic films comprising a magnetic material having anisotropic magnetic properties such that, in operation, said magnetic material is driven in a direction parallel to its hard axis, said magnetic core having a distributed air gap formed therein;
   said conductive material being patterned to make at least one continuous loop around said magnetic core.

9. The magnetic circuit component of claim 8 wherein said magnetic material is selected from a group consisting of ferromagnetic and ferrimagnetic materials.

10. The magnetic circuit component of claim 8 wherein said insulating films comprise a material selected from a group consisting of silicon dioxide, magnesium oxide, aluminum oxide, and polymeric insulating films.

* * * * *